(12) United States Patent
Woehlte

(10) Patent No.: US 11,536,829 B2
(45) Date of Patent: Dec. 27, 2022

(54) VEHICLE RADAR SYSTEM WITH RADAR EMBEDDED INTO RADOME

(71) Applicant: MAGNA ELECTRONICS INC., Auburn Hills, MI (US)

(72) Inventor: Wilhelm Johann Wolfgang Woehlte, Sailauf (DE)

(73) Assignee: MAGNA ELECTRONICS INC., Auburn Hills, MI (US)

( * ) Notice: Subject to any disclaimer, the term of this patent is extended or adjusted under 35 U.S.C. 154(b) by 498 days.

(21) Appl. No.: 15/897,295

(22) Filed: Feb. 15, 2018

(65) Prior Publication Data

US 2018/0231657 A1 Aug. 16, 2018

Related U.S. Application Data

(60) Provisional application No. 62/459,638, filed on Feb. 16, 2017.

(51) Int. Cl.
| | | |
|---|---|---|
| *G01S 13/931* | (2020.01) | |
| *G01S 7/02* | (2006.01) | |
| *H01Q 21/06* | (2006.01) | |
| *H01Q 1/32* | (2006.01) | |
| *H01Q 1/40* | (2006.01) | |
| *H01Q 1/22* | (2006.01) | |

(52) U.S. Cl.
CPC ......... *G01S 13/931* (2013.01); *H01Q 1/3233* (2013.01); *H01Q 1/3283* (2013.01); *H01Q 1/405* (2013.01); *H01Q 21/065* (2013.01); *G01S 7/027* (2021.05); *G01S 2013/93271* (2020.01); *G01S 2013/93275* (2020.01); *H01Q 1/2283* (2013.01)

(58) Field of Classification Search
CPC .......... G01S 13/931; G01S 2013/9389; G01S 2007/027; H01Q 1/405; H01Q 1/3233; H01Q 1/3283; H01Q 21/065; H01Q 1/2283
USPC ........................................................... 342/70
See application file for complete search history.

(56) References Cited

U.S. PATENT DOCUMENTS

| | | | | |
|---|---|---|---|---|
| 3,451,127 A | * | 6/1969 | Irving | H01Q 1/405 29/600 |
| 3,453,620 A | * | 7/1969 | Reed | H01Q 1/286 342/4 |
| 3,509,571 A | * | 4/1970 | Howards, Jr. | H01Q 1/405 343/771 |

(Continued)

FOREIGN PATENT DOCUMENTS

| | | | |
|---|---|---|---|
| GB | 2254489 A | * | 10/1992 |
| WO | 2011090484 A1 | | 7/2011 |
| WO | 2018007995 A1 | | 1/2018 |

*Primary Examiner* — Donald HB Braswell
(74) *Attorney, Agent, or Firm* — Honigman LLP

(57) ABSTRACT

A radar sensing system for a vehicle includes a radar sensor disposed at the vehicle so as to sense exterior of the vehicle. The radar sensor includes a plurality of transmitters that transmit radio signals and a plurality of receivers that receive radio signals. The received radio signals are transmitted radio signals that are reflected from an object. A processor is operable to process an output of the receivers. The radar sensor includes a printed circuit board having circuitry disposed thereat. The radar sensor includes a radome. At least some of the antennas are embedded or encapsulated in the radome.

18 Claims, 4 Drawing Sheets

Side View
w/ PCB

(56) References Cited

U.S. PATENT DOCUMENTS

| | | |
|---|---|---|
| 4,460,901 A * | 7/1984 | Tricoles ................. H01Q 1/405 343/785 |
| 5,949,331 A | 9/1999 | Schofield et al. |
| 6,118,405 A * | 9/2000 | Grunig et al. ........... H01Q 1/38 343/700 |
| 6,587,186 B2 | 7/2003 | Bamji et al. |
| 6,674,895 B2 | 1/2004 | Rafii et al. |
| 6,678,039 B2 | 1/2004 | Charbon |
| 6,690,268 B2 | 2/2004 | Schofield et al. |
| 6,690,354 B2 | 2/2004 | Sze |
| 6,693,517 B2 | 2/2004 | McCarthy et al. |
| 6,710,770 B2 | 3/2004 | Tomasi et al. |
| 6,825,455 B1 | 11/2004 | Schwarte |
| 6,876,775 B2 | 4/2005 | Torunoglu |
| 6,906,793 B2 | 6/2005 | Bamji et al. |
| 6,919,549 B2 | 7/2005 | Bamji et al. |
| 7,053,357 B2 | 5/2006 | Schwarte |
| 7,119,745 B2 * | 10/2006 | Gaucher ................. H01Q 9/26 343/700 MS |
| 7,157,685 B2 | 1/2007 | Bamji et al. |
| 7,176,438 B2 | 2/2007 | Bamji et al. |
| 7,203,356 B2 | 4/2007 | Gokturk et al. |
| 7,212,663 B2 | 5/2007 | Tomasi |
| 7,283,213 B2 | 10/2007 | O'Connor et al. |
| 7,310,431 B2 | 12/2007 | Gokturk et al. |
| 7,321,111 B2 | 1/2008 | Bamji et al. |
| 7,340,077 B2 | 3/2008 | Gokturk et al. |
| 7,352,454 B2 | 4/2008 | Bamji et al. |
| 7,375,803 B1 | 5/2008 | Bamji |
| 7,379,100 B2 | 5/2008 | Gokturk et al. |
| 7,379,163 B2 | 5/2008 | Rafii et al. |
| 7,405,812 B1 | 7/2008 | Bamji |
| 7,408,627 B2 | 8/2008 | Bamji et al. |
| 7,580,795 B2 | 8/2009 | McCarthy et al. |
| 8,013,780 B2 | 9/2011 | Lynam |
| 8,027,029 B2 | 9/2011 | Lu et al. |
| 8,278,749 B2 * | 10/2012 | Lachner ................. H01Q 9/0407 257/693 |
| 8,698,894 B2 | 4/2014 | Briggance |
| 9,036,026 B2 | 5/2015 | Dellantoni et al. |
| 9,146,898 B2 | 9/2015 | Ihlenburg et al. |
| 9,229,102 B1 * | 1/2016 | Wright ................. G01S 13/888 |
| 9,575,160 B1 | 2/2017 | Davis et al. |
| 9,599,702 B1 | 3/2017 | Bordes et al. |
| 9,689,967 B1 | 6/2017 | Stark et al. |
| 9,753,121 B1 | 9/2017 | Davis et al. |
| 9,994,152 B1 * | 6/2018 | Hess ................. H01Q 21/065 |
| 2003/0095074 A1 * | 5/2003 | Scorer ................. H01Q 13/28 343/772 |
| 2006/0092079 A1 * | 5/2006 | de Rochemont .. H01Q 21/0025 343/895 |
| 2008/0079641 A1 * | 4/2008 | McKinnon et al. ..... H01Q 1/22 343/702 |
| 2010/0001897 A1 | 1/2010 | Lyman |
| 2010/0073255 A1 * | 3/2010 | Noll ................. H01L 23/66 343/873 |
| 2010/0245066 A1 | 9/2010 | Sarioglu et al. |
| 2012/0062743 A1 | 3/2012 | Lynam et al. |
| 2012/0218412 A1 | 8/2012 | Dellantoni et al. |
| 2013/0215271 A1 | 8/2013 | Lu |
| 2013/0222592 A1 | 8/2013 | Gieseke |
| 2014/0218529 A1 | 8/2014 | Mahmoud et al. |
| 2014/0375476 A1 | 12/2014 | Johnson et al. |
| 2015/0124096 A1 | 5/2015 | Koravadi |
| 2015/0130673 A1 * | 5/2015 | Ng ................. H01Q 9/0421 343/713 |
| 2015/0158499 A1 | 6/2015 | Koravadi |
| 2015/0251599 A1 | 9/2015 | Koravadi |
| 2015/0352953 A1 | 12/2015 | Koravadi |
| 2016/0036917 A1 | 2/2016 | Koravadi et al. |
| 2016/0210853 A1 | 7/2016 | Koravadi |
| 2017/0129489 A1 | 5/2017 | Pawlicki et al. |
| 2017/0222311 A1 | 8/2017 | Hess et al. |
| 2017/0254873 A1 | 9/2017 | Koravadi |
| 2017/0276788 A1 | 9/2017 | Wodrich |
| 2017/0315231 A1 | 11/2017 | Wodrich |
| 2017/0356994 A1 | 12/2017 | Wodrich et al. |
| 2018/0015875 A1 | 1/2018 | May et al. |
| 2018/0045812 A1 | 2/2018 | Hess |
| 2018/0059236 A1 | 3/2018 | Wodrich et al. |
| 2018/0065623 A1 | 3/2018 | Wodrich et al. |
| 2018/0067194 A1 | 3/2018 | Wodrich et al. |
| 2018/0105176 A1 | 4/2018 | Pawlicki et al. |
| 2018/0136312 A1 * | 5/2018 | Fetterman ............. G01S 13/878 |
| 2018/0231635 A1 | 8/2018 | Woehlte |
| 2018/0299533 A1 | 10/2018 | Pliefke et al. |
| 2019/0061760 A1 | 2/2019 | Pawlicki et al. |
| 2019/0072666 A1 | 3/2019 | Duque Biarge et al. |
| 2019/0072667 A1 | 3/2019 | Duque Biarge et al. |
| 2019/0072668 A1 | 3/2019 | Duque Biarge et al. |
| 2019/0072669 A1 | 3/2019 | Duque Biarge et al. |
| 2019/0217775 A1 | 7/2019 | May et al. |

* cited by examiner

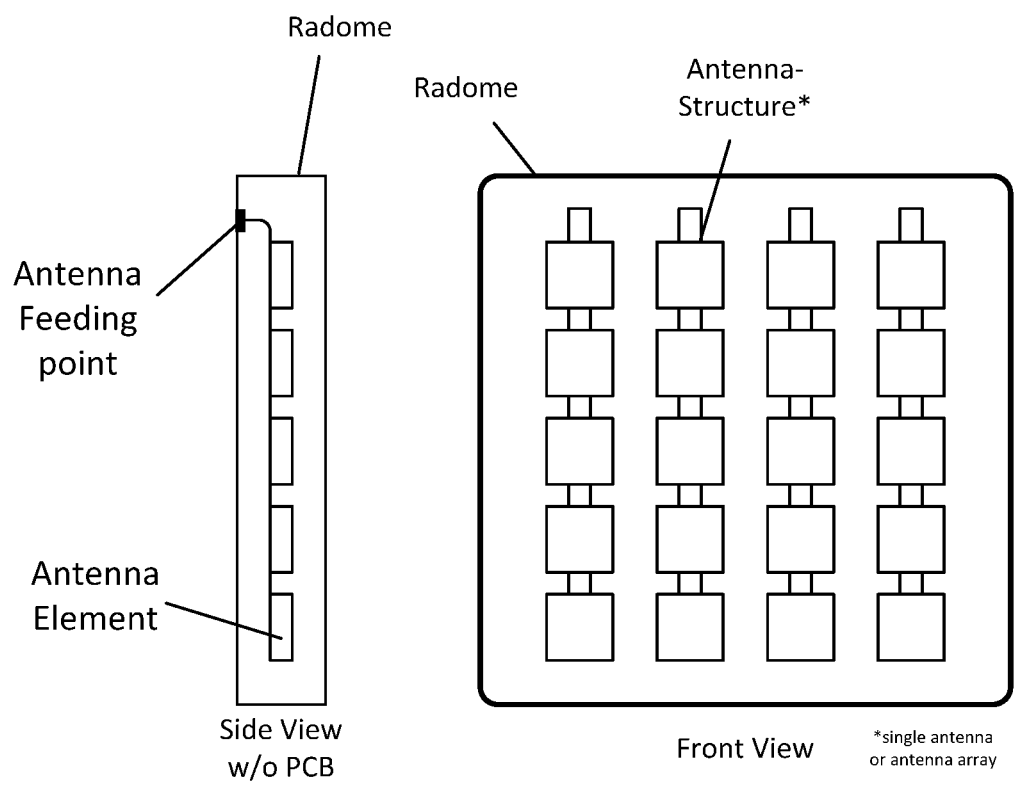

VEHICLE RADAR SYSTEM WITH RADAR EMBEDDED INTO RADOME

CROSS REFERENCE TO RELATED APPLICATION

The present application claims the filing benefits of U.S. provisional application Ser. No. 62/459,638, filed Feb. 16, 2017, which is hereby incorporated herein by reference in its entirety.

FIELD OF THE INVENTION

The present invention relates generally to a vehicle sensing system for a vehicle and, more particularly, to a vehicle sensing system that utilizes one or more radar sensors at a vehicle.

BACKGROUND OF THE INVENTION

Use of imaging and radar sensors in vehicle imaging systems is common and known. Examples of such known systems are described in U.S. Pat. No. 8,013,780, which is hereby incorporated herein by reference in its entirety.

SUMMARY OF THE INVENTION

The present invention provides a driving assistance system or sensing system or control system for a vehicle that utilizes one or more radar sensors to sense regions exterior of the vehicle, with the radar sensor that transmits and receives signals, with the received signals processed to detect the presence of objects at or near the vehicle in the field of sensing of the sensor. The radar sensor includes a radome structure and a printed circuit board having circuitry disposed thereat. At least some of the antennas are disposed in or embedded in or insert molded within the radome (such as via molding or forming the radome around the antennas, with an electrical lead exposed to electrically connect the antennas to circuitry of the printed circuit board). The printed circuit board may be adhered or attached at the radome, and circuitry of the printed circuit board electrically connects to at least one feed point at a surface of the radome to electrically connect to the at least some of the antennas. Optionally, a surface of the radome at which the printed circuit board is attached may be recessed to provide a cavity to receive passive elements disposed at the printed circuit board when the printed circuit board is attached at the radome. Preferably, the radar sensors of the present invention are used in conjunction with a plurality of image sensors mounted at the equipped vehicle and more preferably with at least one lidar sensor also mounted (along with the image sensors and the radar sensor) at the equipped vehicle. Image data and radar data and lidar data are preferably provided to a central electronic control unit (ECU) or module for processing thereat.

These and other objects, advantages, purposes and features of the present invention will become apparent upon review of the following specification in conjunction with the drawings.

BRIEF DESCRIPTION OF THE DRAWINGS

FIG. 2 is a front plan view of an antenna structure embedded in radome in accordance with the present invention;

FIG. 3 is a sectional view of the radome of FIG. 2;

DESCRIPTION OF THE PREFERRED EMBODIMENTS

Figure 1:
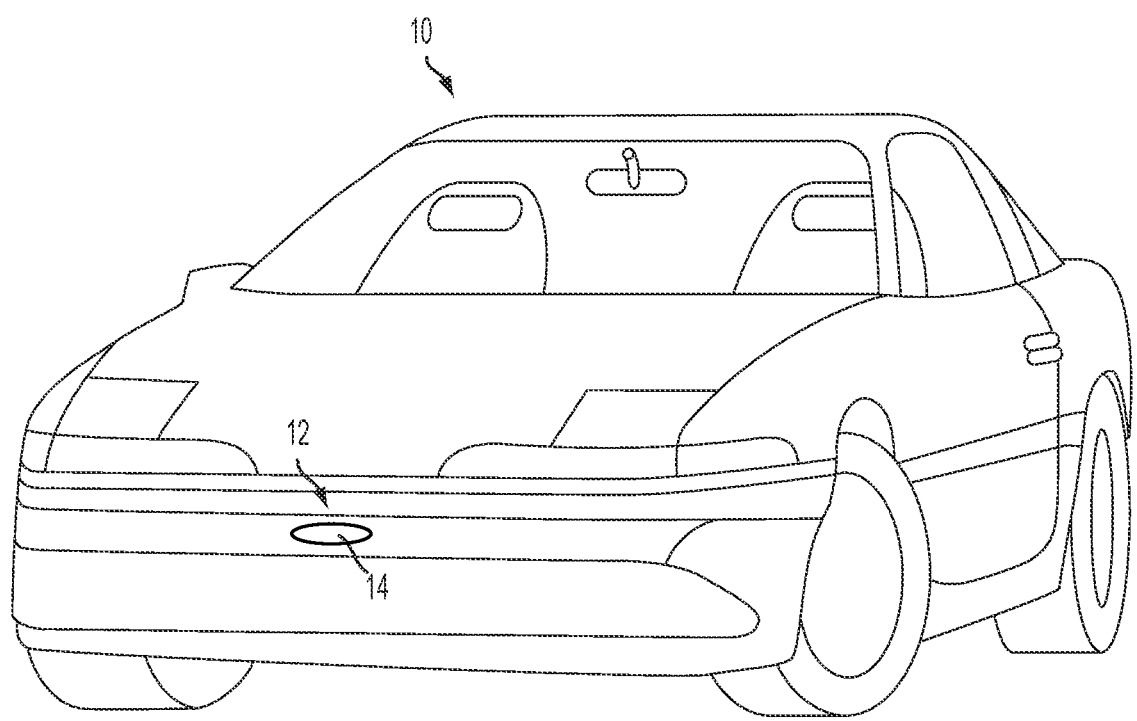
FIG. 1 is a perspective view of a vehicle with a sensing system that incorporates a radar sensor in accordance with the present invention.

A vehicle sensing system and/or driver assist system and/or driving assist system and/or object detection system and/or alert system operates to capture sensing data exterior of the vehicle and may process the captured data to detect objects at or near the vehicle and in the predicted path of the vehicle, such as to assist a driver of the vehicle or a control for an autonomous vehicle in maneuvering the vehicle in a forward or rearward direction. The system includes a processor that is operable to receive sensing data from one or more sensors and provide an output, such as an alert or control of a vehicle system.

Referring now to the drawings and the illustrative embodiments depicted therein, a vehicle 10 (FIG. 1) includes an driving assistance system or sensing system 12 that includes at least one radar sensor unit, such as a forward facing radar sensor unit 14 (and the system may optionally include multiple exterior facing sensors, such as cameras or other sensors, such as a rearward facing sensor at the rear of the vehicle, and a sideward/rearward facing sensor at respective sides of the vehicle), which sense regions exterior of the vehicle. The sensing system 12 includes a control or electronic control unit (ECU) or processor that is operable to process data captured by the sensor or sensors and may detect objects or the like. The data transfer or signal communication from the sensor to the ECU may comprise any suitable data or communication link, such as a vehicle network bus or the like of the equipped vehicle.

The radar sensor or sensors of the driving assist system may be used in conjunction with a plurality of image sensors mounted at the equipped vehicle and/or with at least one lidar sensor also mounted (along with the image sensors and the radar sensor) at the equipped vehicle. Image data and radar data and lidar data are provided to a central electronic control unit (ECU) or module for processing thereat. The ECU includes at least one processor that processes the captured/sensed data, whereby one or more functions or systems (such as a braking system and/or steering system and/or the like) of the vehicle is controlled responsive to processing of the captured/sensed data.

The system includes one or more transmitter antennas and one or more receiver antennas, which are at the sensor and operable to transmit and receive radio frequency signals. The radar sensor includes a radome that provides a protective material that minimally attenuates the electromagnetic signals transmitted by and sensed or received by the radar sensor.

Figures 4, 5:
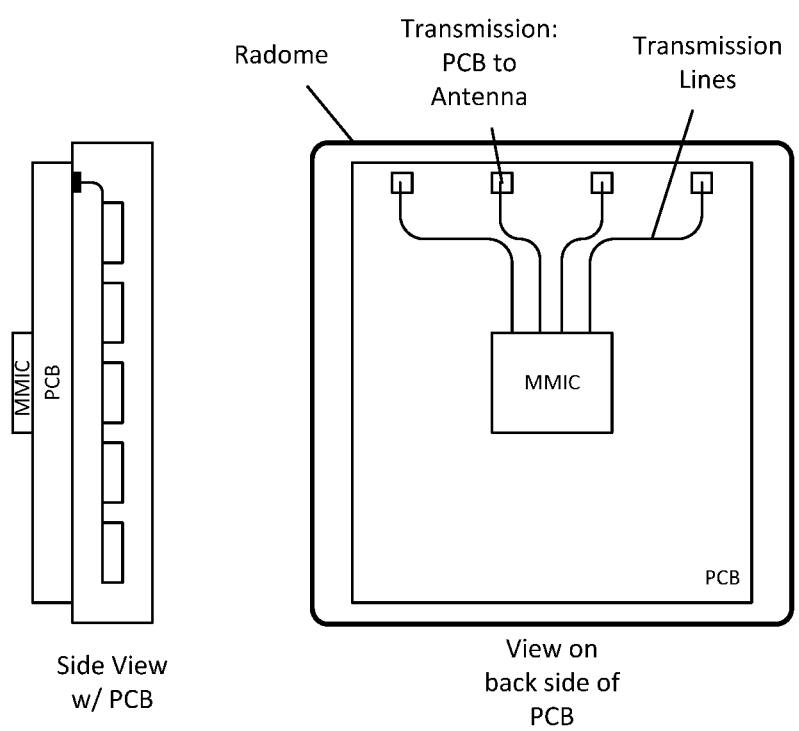
FIG. 4 is a rear plan view of the radome of FIG. 2, with a printed circuit board (PCB) disposed thereat.
FIG. 5 is a sectional view of the radome and PCB construction of FIG. 4.

Current automotive radars comprise a PCB with a planar antenna structure such as patch or slot antennas. These structures may comprise an antenna array. The PCB with antenna structure is mounted in a housing, and the part of the housing that is between the antenna structure and the outside world is called a radome. Vehicle radars have a certain distance or gap between the antenna and the radome. It is possible to integrate the antenna structure into the radome (via, for example, forming or molding or overmolding, where the antennas are placed in a mold cavity and the radome material is molded or injection molded in the cavity so as to encompass or encapsulate or embed the antennas in the radome, with an electrical lead of the antennas exposed at or accessible at an exterior surface of the molded radome). In this case it is possible to glue the PCB at or into the radome (see FIGS. 4 and 5) and feed the antenna structure over the PCB with different techniques like waveguides or a pin/pad which provides a contact point between the PCB and the antenna structure within the radome (see, for example, FIGS. 2-5). As shown in FIGS. 3 and 5, the antenna structure is connected to a feeding point at the surface of the radome, and the PCB electrically connects to the feeding point when attached or adhered at the radome. As shown in FIG. 4, multiple transmission lines may electrically connect to feeding points of multiple antenna structures to electrically connect the Monolithic Microwave Integrated Circuit (MMIC) to the antenna.

Figure 6:
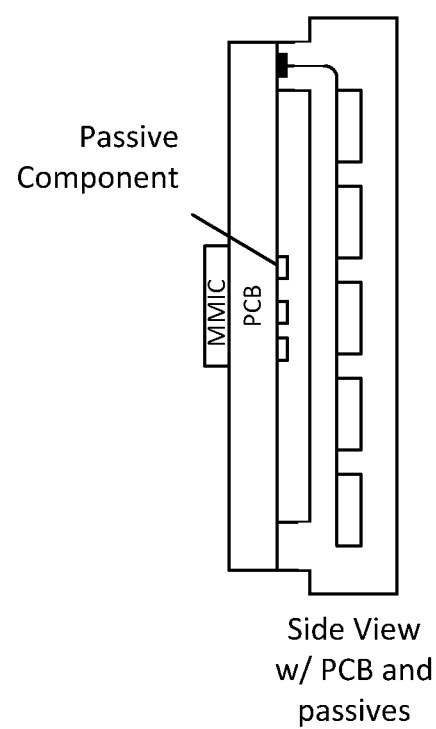
FIG. 6 is a sectional view of another radome and PCB construction, shown with the radome shaped for other electrical components (e.g., passive components) disposed at a side of the PCB.

If it is not possible to glue the PCB with the full PCB area into the radome because of the need of electrical components such as decoupling capacitors, it may be possible to shape the inner surface of the radome to have a cavity or recess in the radome surface and between the radome and the PCB side with, for example, passive components (see, for example, FIG. 6).

The material of the radome needs to be a low loss material which needs to be selected on the used frequency range (e.g., 24 GHz or 77 GHz). It can be used in different type of automotive radars, such as front radars (such as shown in FIG. 1), corner radars or radars for radar cocooning (ultrasonic replacement).

The antenna may comprise any suitable antenna structure, such as any one of the known antenna structures (patch antenna, slot antenna, etc.). The embedded antenna also eliminates one issue of the current printed/planar antenna structures, which is related to the manufacturing processes of such high-frequency printed circuit boards (PCBs).

The PCB based antennas are manufactured by today's state of the art PCB manufacturing processes such as etching and drilling. These manufacturing process are hard to control and reproduce. When the copper of the PCB is etched, to achieve the structure, unwanted side effects like under-etching will occur. The under-etching may have an influence on the antenna and how the antenna pattern will look and perform.

Another point is that holes in PCBs are mechanically drilled or drilled with a laser. These holes are the base for vias. Vias are used as transitions between layers of the PCB or as connection for different GND-planes. A SIW (Substrate Integrated Waveguide) can be realized with GND-vias. Not only are the tolerances of the holes/vias, such as tolerances for the diameter, hard to control, but also the position of one via relative to another via is hard to control and reproduce from PCB to PCB. Additionally, size and placement of vias is very important within automotive radar PCBs.

A third point is the surface roughness. A rough surface will harm or adversely affect radar applications. It is possible that the radiating elements (antennas) are damaged by the PCB production processes like etching and drilling.

The antenna that is embedded into the radome in accordance with the present invention can be produced by, for example, laser cutting. This is a reproducible process with tight tolerances. Also, the risk of damaging the surface is lower than during an etching process.

Another potential issue that will be solved with an embedded antenna of the present invention is that the inside of the radome needs to be very smooth, even when the antenna is PCB based. Every little inhomogeneity will harm or adversely affect the antenna pattern and will have a negative influence on the performance of the radar. With an embedded antenna the inside of the radome is not as critical as with the current radars. This lowers the cost as well.

The sensing system may utilize aspects of the systems described in U.S. Pat. Nos. 8,027,029; 8,013,780; 6,825,455; 7,053,357; 7,408,627; 7,405,812; 7,379,163; 7,379,100; 7,375,803; 7,352,454; 7,340,077; 7,321,111; 7,310,431; 7,283,213; 7,212,663; 7,203,356; 7,176,438; 7,157,685; 6,919,549; 6,906,793; 6,876,775; 6,710,770; 6,690,354; 6,678,039; 6,674,895 and/or 6,587,186, and/or International Publication Nos. WO 2018/007995 and/or WO 2011/090484, and/or U.S. Publication Nos. US-2018-0015875; US-2017-0356994; US-2017-0315231; US-2017-0276788; US-2017-0254873; US-2017-0222311 and/or US-2010-0245066, and/or U.S. patent application Ser. No. 15/675,919, filed Aug. 14, 2017, now U.S. Pat. No. 10,641,867, and/or Ser. No. 15/897,268, filed Feb. 15, 2018, now U.S. Pat. No. 10,782,388, which are all hereby incorporated herein by reference in their entireties.

Changes and modifications in the specifically described embodiments can be carried out without departing from the principles of the invention, which is intended to be limited only by the scope of the appended claims, as interpreted according to the principles of patent law including the doctrine of equivalents.

The invention claimed is:

1. A radar sensing system for a vehicle, said radar sensing system comprising:

a radar sensor disposed at the vehicle so as to sense exterior of the vehicle;

wherein said radar sensor comprises a plurality of transmitting antennas that transmit radio signals, a plurality of receiving antennas that receive radio signals, and wherein the received radio signals are transmitted radio signals that are reflected from an object;

wherein the transmitting antennas and the receiving antennas are arranged in rows and columns to establish at least one antenna array;

a processor operable to process outputs of said receiving antennas;

wherein said radar sensor comprises a printed circuit board having circuitry disposed thereat;

wherein said radar sensor comprises a radome;

wherein said radome consists of a single injection molded composition that is molded over and around said at least one antenna array;

wherein said at least one antenna array is embedded in said radome and surrounded by said radome;

wherein said radome comprises at least one feed point that is electrically connected to said at least one antenna array embedded in said radome;

wherein said printed circuit board electrically connects to the at least one feed point of said radome to electrically connect to said at least one antenna array embedded in said radome; and wherein said printed circuit board is fixedly attached directly at said radome and is spaced from said at least one antenna array by a portion of the radome.

2. The radar sensing system of claim 1, wherein the at least one feed point is accessible at an outer surface of said radome, and wherein said printed circuit board electrically connects to the at least one feed point when said printed circuit board is attached at said radome.

3. The radar sensing system of claim 1, wherein said printed circuit board has a first side and a second side opposite the first side, and wherein the first side of said printed circuit board contacts and attaches at said radome at least around a periphery of the first side of said printed circuit board.

4. The radar sensing system of claim 3, wherein said printed circuit board comprises a plurality of transmission lines and a Monolithic Microwave Integrated Circuit.

5. The radar sensing system of claim 4, wherein said transmission lines electrically connect to the at least one feed point to electrically connect said at least one antenna array to the Monolithic Microwave Integrated Circuit.

6. The radar sensing system of claim 3, wherein circuitry of said printed circuit board comprises electrical elements disposed at the first side of said printed circuit board, and wherein a surface of said radome at which the first side of said printed circuit board is attached is recessed to provide a cavity to receive the electrical elements disposed at the first side of said printed circuit board when said printed circuit board is attached at said radome.

7. The radar sensing system of claim 1, wherein said processor processes the outputs of said receiving antennas to detect an object exterior the vehicle.

8. The radar sensing system of claim 7, wherein said processor is part of a driving assist system, and wherein said driving assist system controls at least one function of the vehicle responsive to said processor processing the outputs of said receiving antennas.

9. A radar sensing system for a vehicle, said radar sensing system comprising:
  a radar sensor disposed at the vehicle so as to sense exterior of the vehicle;
  wherein said radar sensor comprises a plurality of transmitting antennas that transmit radio signals, a plurality of receiving antennas that receive radio signals, and wherein the received radio signals are transmitted radio signals that are reflected from an object;
  wherein at least the transmitting antennas are arranged in rows and columns to establish at least one antenna array;
  a processor operable to process outputs of said receiving antennas;
  wherein said radar sensor comprises a printed circuit board having circuitry disposed thereat;
  wherein said radar sensor comprises a radome;
  wherein said radome consists of a single injection molded composition that is molded over and around the individual antennas of said at least one antenna array to encapsulate said at least one antenna array within said radome;
  wherein said radome comprises at least one feed point of an electrically conductive lead that is at least partially encapsulated in said radome and that is electrically connected to said at least one antenna array encapsulated in said radome;
  wherein said printed circuit board electrically connects to the at least one feed point of said radome to electrically connect to said at least one antenna array embedded in said radome; and
  wherein said printed circuit board is fixedly attached directly at said radome and is spaced from said at least one antenna array by a portion of the radome.

10. The radar sensing system of claim 9, wherein said printed circuit board has a first side and a second side opposite the first side, and wherein the first side of said printed circuit board contacts and attaches at said radome at least around a periphery of the first side of said printed circuit board.

11. The radar sensing system of claim 10, wherein said printed circuit board comprises a plurality of transmission lines and a Monolithic Microwave Integrated Circuit.

12. The radar sensing system of claim 11, wherein said transmission lines electrically connect to the at least one feed point to electrically connect said at least one antenna array to the Monolithic Microwave Integrated Circuit.

13. The radar sensing system of claim 10, wherein circuitry of said printed circuit board comprises electrical elements disposed at the first side of said printed circuit board, and wherein a surface of said radome at which the first side of said printed circuit board is attached is recessed to provide a cavity to receive the electrical elements disposed at the first side of said printed circuit board when said printed circuit board is attached at said radome.

14. The radar sensing system of claim 9, wherein said processor processes the outputs of said receiving antennas to detect an object exterior the vehicle, and wherein said processor is part of a driving assist system, and wherein said driving assist system controls at least one function of the vehicle responsive to said processor processing the outputs of said receiving antennas.

15. A method for manufacturing a radar sensor for a vehicle, the method comprising:
  providing a plurality of transmitting antennas that communicate radio signals and a plurality of receiving antennas that receive radio signals that are transmitted and reflect from an object;
  providing a radome comprising a protective material that minimally attenuates electromagnetic signals;
  forming the radome, consisting of a single injection molded composition, over and around at least the transmitting antennas to encapsulate the transmitting antennas within the radome with at least one feed point at an outer surface of the formed radome that is electrically connected to the transmitting antennas encapsulated in the radome;
  providing a printed circuit board having circuitry for transmitting the radio signals via the plurality of transmitting antennas and for receiving signals via the plurality of receiving antennas; and
  fixedly attaching the printed circuit board directly to the radome such that the printed circuit board is spaced from said plurality of transmitting antennas and said plurality of receiving antennas by a portion of the radome, and electrically connecting circuitry of the printed circuit board to the transmitting antennas via electrically connecting the printed circuit board to the at least one feed point.

16. The method of claim 15, wherein the printed circuit board has a first side and a second side opposite the first side, and wherein attaching the printed circuit board to the radome comprises contacting and attaching the first side of the printed circuit board at the radome at least around a periphery of the first side of the printed circuit board.

17. The method of claim 16, wherein forming the radome over and around the transmitting antennas comprises forming the radome over and around individual antennas of the transmitting antennas and an electrical lead that is encapsulated within the radome when the radome is formed over and around the transmitting antennas, and wherein the electrical lead has one end connected to an encapsulated antenna and an opposite end at the feed point at the outer surface of the radome.

18. The method of claim 16, wherein circuitry of the printed circuit board comprises electrical elements disposed at the first side, and wherein a surface of the radome at which the printed circuit board is attached is recessed to provide a cavity to receive the electrical elements disposed at the first side of the printed circuit board when the printed circuit board is attached to the radome.

* * * * *